United States Patent [19]

Robley, deceased

[11] E Re. 29,364

[45] Reissued Aug. 23, 1977

[54] METHOD OF SUBMARINE PIPE LAYING

[75] Inventor: Spencer H. Robley, deceased, late of La Crescenta, Calif.

[73] Assignee: Underwater Devices, Inc., Sherman Oaks, Calif.

[21] Appl. No.: 752,241

[22] Filed: Dec. 14, 1976

Related U.S. Patent Documents

Reissue of:

[64] Patent No.: 3,267,682
Issued: Aug. 23, 1966
Appl. No.: 419,693
Filed: Dec. 21, 1964

U.S. Applications:

[63] Continuation-in-part of Ser. No. 319,126, Oct. 28, 1963, Pat. No. 3,204,417.

[51] Int. Cl.[2] ..... F16L 1/00
[52] U.S. Cl. ..... 61/111; 214/1 P
[58] Field of Search ..... 61/105, 106, 110, 111, 61/41 A, 43, 69; 214/1 P

[56] References Cited

U.S. PATENT DOCUMENTS

| | | | |
|---|---|---|---|
| 436,914 | 9/1890 | Fischer | 61/111 |
| 1,874,081 | 8/1932 | Burrows | 61/43 X |
| 2,333,208 | 11/1943 | Spear | 61/105 X |
| 2,830,548 | 4/1958 | McElvany | 61/106 |
| 3,012,406 | 12/1961 | Lassen-Nielsen | 61/69 X |
| 3,014,984 | 12/1961 | Jacobson | 61/69 X |
| 3,099,913 | 8/1963 | Melton et al. | 61/69 R |

OTHER PUBLICATIONS

Giant Pipe-Layer, Popular Science, Aug. 1959, pp. 95–98.
Western Construction, May 1963, pp. 74, 78, 79, 80.
Engr. News-Record, May 17, 1951, p. 52.

*Primary Examiner*—Jacob Shapiro
*Attorney, Agent, or Firm*—Lyon & Lyon

[57] *ABSTRACT*

*A method of laying pipe on the floor of a body of water to form a pipeline in which the pipe section to be joined is at all times securely and stably supported by a mobile frame such that, during alignment and engagement, the pipe is substantially free from the influence of wave and current action. A pipe section is first releasably attached to a mobile frame, then lowered to the floor where it is placed in a stable-fixed position on the floor generally aligned with but spaced from the end of the previously laid pipe. The end is then aligned with the pipeline by lateral and/or tilting movement of the frame, and then moved axially into engagement with the end of the pipeline. The alignment and engagement procedures may be observed, directed and/or controlled from a region at atmospheric pressure. The method may also include holding the engaged pipe section in a stable position while placing ballast material thereunder. After engagement, the frame is released from the section and returned to the surface.*

5 Claims, 5 Drawing Figures

Fig. 1

METHOD OF SUBMARINE PIPE LAYING

Figure 1:
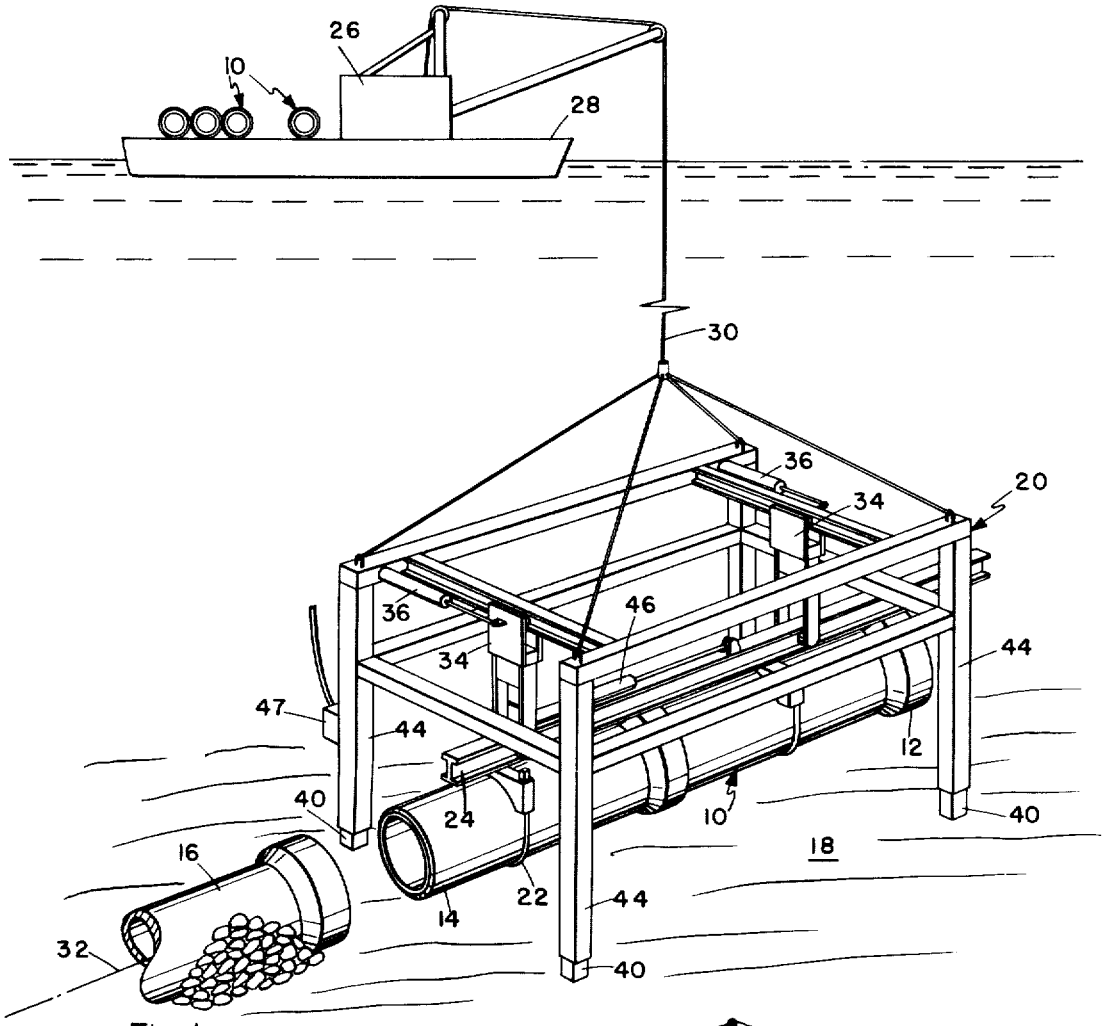

Matter enclosed in heavy brackets [ ] appears in the original patent but forms no part of this reissue specification; matter printed in italics indicates the additions made by reissue.

*This is a continuation-in-part of application Ser. No. 319,126, filed Oct. 28, 1963, now U.S. Pat. No. 3,204,417, issued Sept. 7, 1965.*

This invention relates generally to a method of laying pipe consisting of a plurality of connected sections and more particularly to a method of laying such pipe on the floor of a body of water such as an offshore portion of an ocean floor, or a lake bottom or riverbed.

BACKGROUND

Several methods have in the past been employed in the laying of submarine pipe in segments, hereinafter referred to simply as sections. These prior systems included employment of various screw jacks, collars attached to the pipe, and the like, connected by divers between the prior laid pipe and the section being laid, the latter sometimes being made more easily maneuverable by attaching buoyancy elements thereto. However, great difficulty has been encountered in preventing dislocation of the prior laid pipe and the system is generally very laborious and slow.

In maneuvering larger, heavier sections, cables or the like have in the past been employed to transmit movement of a surface floating platform, with derricks or the like, to the suspended section and again divers have been used to direct such movement of the surface platform. This system is also slow, hazardous and expensive, again partly due to the tendency for the prior laid pipe to be dislodged, the inherent and underlying difficulty being that the surface floating platform is seldom perfectly stable and control movements of the suspended section is erractic and unpredictable in degree as a result.

Another method was characterized by dependence on a flexible cable connected to the section being laid and extending, axially through the portion of the line of pipe already in place, to a winch, usually installed on shore, to pull the new section longitudinally into place.

Still another method has been employed in the recent past, with questionable efficiency, this system involving use of a fixed platform supported on the offshore bay or ocean floor, lake bed or river bed by extensible legs of great length, the pipe sections being lowered from or through the platform which is moved forward as each section or small number of sections is laid. This system is reasonably successful in laying pipe in shallow water but failed when greater depths of water were encountered.

Numerous variations of the above briefly described methods have been evolved. The difficulties involved in all their prior systems, other than those obviously evident, include the very important factor of rapidly accelerating costs when the depth of the water is increased beyond a few feet and most of the prior systems become infeasible when the depth of the water exceeds one hundred feet.

OBJECTS OF THE INSTANT INVENTION

It is a primary object of this invention to provide a method of laying successive sections of submarine pipe which is adapted for use where the depth of water virtually precludes other methods.

It is another object of this invention to provide a method of submarine pipe laying wherein the successive sections are negotiated into place without danger of dislodging prior laid pipe.

It is another object of this invention to provide a method of submarine pipe laying wherein the alignment and connecting movements of the sections being laid are accomplished with reference only to a frame or gantry temporarily but firmly stationed, and thus simplified and greatly accelerated.

It is a further object of this invention to provide a method of laying submarine pipe wherein the step of final maneuvering of the pipe sections into place may be guided alternatively by a diver or by electronic devices, this being an important consideration.

Finally, it is an object of this invention to provide a method which may be complemented by or include the accurate and economical placement of ballast around and under the newly laid pipe sections in such manner as to prevent dislodgement of the newly laid sections.

DRAWINGS

The inventive method is illustrated in the accompanying drawings, in which:

FIG. 1 is a view, in perspective, illustrating diagrammatically initial principal steps of my method, namely, shiftably supporting of a section of pipe on a gantry, shown at the instant the latter has been lowered, by a crane mounted on a floating platform, the barge and crane being illustrated on a relatively reduced scale, into fixed position on the floor under a body of water.

Figure 2:
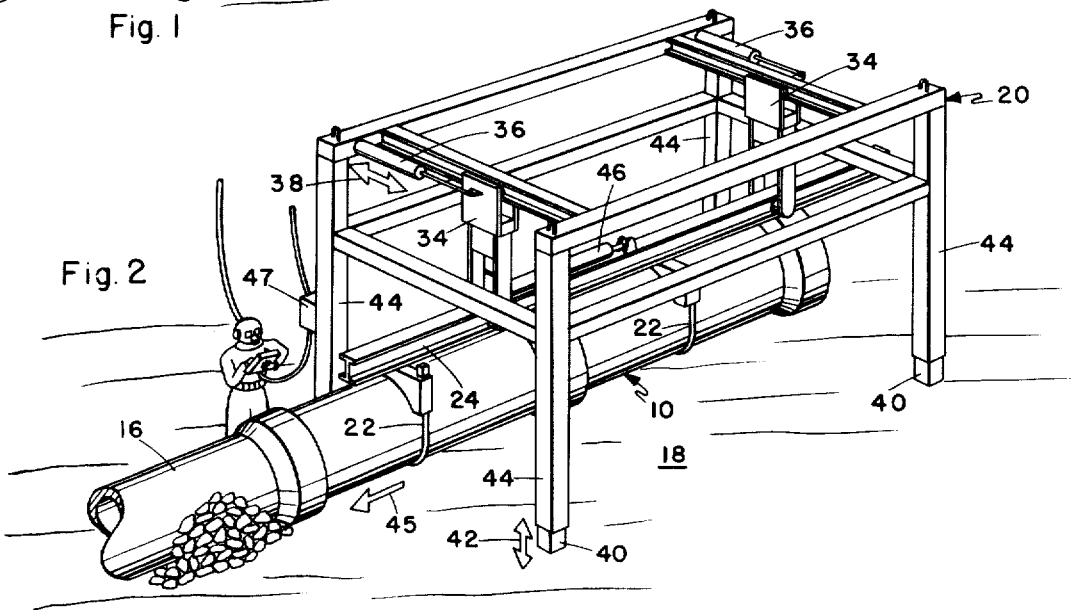

FIG. 2 diagrammatically presents another principal step of my method, namely, the final maneuvering of the section into alignment and connection with the prior laid pipe, this figure having the lifting cables completely removed to emphasize the feature that such final maneuvering is accomplished independently of any movement of or reaction with the floating platform.

Figure 3:
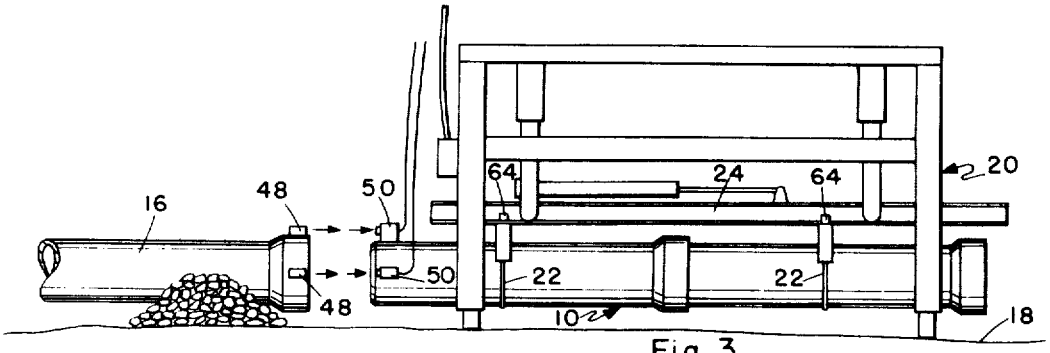
Figure 4:
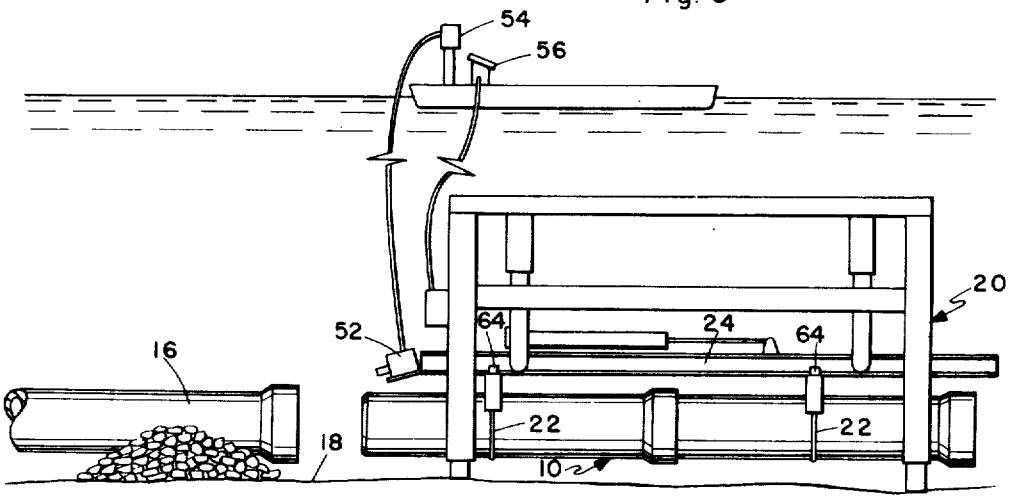
Figure 5:
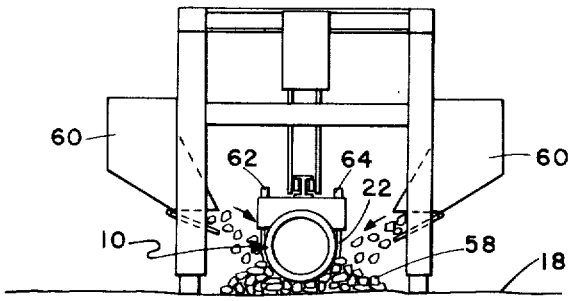

FIG. 3 is a diagrammatic view indicating how the step of final aligning and connection of the sections is guided by electronic sensing devices;

FIG. 4 is a view similar to FIG. 3 indicating use of a closed circuit television system for guiding the final aligning and connection; and FIG. 5 is a diagrammatic view illustrating the accurate and metered ballasting of the newly laid section accomplished while the section is still supported by the gantry, this view, considered with other figures of the drawing indicating how the lashing is releasible on opposite sides of the pipe so that, when the lashing is pulled free after the ballast is in place, there is no tendency to rotate or dislodge the section.

Similar characters of reference designate similar or identical parts and portions throughout the several views. Reference will be made to the drawings in the following description of the method but no attempt will be made to specify the mechanical details of the equipment used to implement the method.

As already pointed out, the drawings herein are merely diagrammatic and are not intended to show all structural details of a practical apparatus. They designate components that are well known types of mechanisms to those skilled in the art. For a more detailed disclosure of an apparatus capable of performing the present method, please see applicant's Pat. No. 3,204,417, issued Sept. 7, 1965.

THE METHOD STEPS

At least one section 10 of pipe, each normally having a bell 12 on one end and a spigot 14 on the other end, are connected according to this method to prior laid sections, one of which is represented fragmentarily at 16, on the bed or floor 18 under a body of water. The floor 18 will in most instances require adequate prior survey and may also require certain preparation but this is not considered a step in the instant method which can be practiced with minimal or even no prior preparation of the bed or floor.

The first step of this methods is, therefore, the supporting or attachment of a section 10 on a pipe layer frame or gantry such as that indicated somewhat diagrammatically in the drawings and generally identified by the numeral 20, the attachment being accomplished normally by lashing, as at 22, a section 10 or a small number of preconnected sections, onto a spine 24 which is shiftable relative to the gantry. It is important to note that the section is thus shiftably supported on the gantry. It will also be noted that the initial attachment to the spine 24 is facilitated by the shiftability of the spine, the normal procedure being to set the gantry over the section and to shift the spine, into proper relation with the section, while still on the floating platform or barge 28 and then complete the lashing of the section to the spine, after which the spine and section are shifted to a substantially central position in the gantry, the shiftability feature being more fully explained hereinafter.

The next principal step of my method is the stationing of the gantry, with the section supported therein, on the bed or floor 18, usually immediately ahead of the last prior laid section 16. This is accomplished by the crane 26 on the floating platform or barge 28. Any suitable suspension harness and cable 30 may be used and the gantry need be positioned only reasonably close to accurately astraddle the projected axis 32 of the prior laid section 16. It is important to note, however, that the gantry is firmly stationed on the bed or floor 18, even though this stationing is temporary.

The next step of the method is the maneuvering of the section 10 into accurate alignment and proper connection with the prior laid section 16. This is accomplished by exerting pushing and pulling forces acting between the section 10 and the gantry 20. As illustrated, the gantry is provided with carriages 34 operated by jacks 36 and mounted for movement in the direction of the double arrow 38 transversely of the gantry. The spine with the section 10 attached is thus shifted and twisted transversely and, combined with a controlled movement enabled by the individually vertically adjustable feet 40 on the legs 44, which can tilt and/or move the gantry vertically, permits the section 10 to be accurately aligned with the projected axis 32 of the prior laid section 16. The twisting referred to above is made possible by the fact that the carriages 34 engage the transverse rails with considerable clearance and likewise the spine 24 is supported by rollers on depending legs carried by carriages 34 and there is considerable clearance between those rollers and the spine. The clearance mentioned permits some relative lateral movement between the two carriages 34 to impart a lateral twisting to the spine 24. However, if greater angular movement is desired, suitable pivotal connections between the depending legs and the carriages 34 may be provided, in the manner disclosed in considerable detail in the aforementioned Pat. No. 3,204,417. It will be obvious to those skilled in the art how the range of twisting movement may be increased. The section 10 is then pulled axially in the direction of arrow 45, as by the jack 46 connected between one carriage 34 and the spine 24, so that its spigot 14 is entered into the bell of the prior laid section 16. Ordinarily, in large pipe, the spigot is provided with one or more O-rings of neoprene or the like and the joints must be tested for leak-proof integrity and my method is compatible with all such conventional structure and procedure.

The maneuvering of the section 10 must be guided. The operation being often, or even usually, conducted at considerable depths of water and under conditions of limited visibility, a diver is ordinarily employed and he, usually by a diver operated control unit as at 47, or by remote control of equipment on the floating platform or barge 28, not illustrated, operates power means on the gantry, such as the illustrated jacks 36 and 46 and adjustable feet 40, to move the spine 24 and thus accomplish said alignment and connection of the pipe sections.

Alternatively, the guiding function can be performed without employment of the diver or with minimum employment of the diver, by resort to trans-receiving devices temporarily mounted on the distal end of said prior laid section 16, as at 48 and on the spine 24 or on the section 10, as indicated at 50, with a complement of signal transmitting and interpreting means, not illustrated, ordinarily installed on the floating platform or barge 28. Constant or periodic signals transmitted from transmitters 48, for example, are picked up by receivers 50 in intensity varying according to relative proximity and direction and these signals guide surface operators in the stationing of the gantry and the final maneuvering of the section 10 into position.

As another alternative, the guiding function is accomplished by use of a closed circuit television camera suitably mounted, as indicated at 52 in FIG. 4, on the spine 24, to permit a surface operator employing a viewer 54 and console 56 to control the stationing of the gantry and the final maneuvering of the spine 24 and section 10 into proper connection with the prior laid section.

The step of ballasting the newly laid section in place is accomplished according to my method both expeditiously and more efficiently and accurately than by prior art methods. A metered quantity of suitable ballasting material 58, usually very coarse gravel, is loaded into volumetric hoppers 60 mounted on the gantry, the loading being, of course, accomplished before descent of the gantry, and the unloading being oridinarily and preferably accomplished by remote control or by the diver, before the section 10 is released from the spine 24. This procedure results in adequate ballast being directed under the newly laid section and generally improves the economical and efficient use of the ballasting material. It will also be noted that since the ballast is placed while the section 10 is still lashed to the spine and the latter being firmly stationed, the ballasting operation per se is not likely to disturb the accomplished proper aligning and connection of the section 10. To further insure against disturbance of the newly laid section, the lashing 22 at opposite ends of the section 22 is released on opposite sides as diagrammatically illustrated at 62–64 so that when the lashing elements are pulled free after ballasting, there is no tendency to rotate the section 10.

Finally the gantry is shifted and the above described steps, with or without the ballasting step as the circumstances require, are repeated.

It is understood that minor variation from the form of the invention disclosed herein may be made without departure from the spirit and scope of the invention, and that the steps of the method may be varied, as well as preceded and/or followed by other steps, and that the steps claimed may include necessary or desirable substeps not fully recited, all within the metes and bounds of the appended claims.

I claim:

1. The method of laying pipe on the floor under a body of water, comprising the steps of: releasably securing a length of pipe to a mobile frame; lowering said frame and pipe in said body of water to a stable position wherein said frame is supported securely by and in fixed relation to said floor with said length of pipe generally aligned with but spaced from the end of a pipeline already on said floor; moving at least a portion of said length of pipe, laterally of its length and relative to said frame, while holding the same secured thereto and supported thereby to bring the axis of said length of pipe into a desired and stable relation to the axis of said pipeline; and then moving said length of pipe axially, relative to said frame while holding the same secured thereto and supported thereby, into engagement with the end of said pipeline to form a continuation thereof.

2. The method defined in claim 1 including the further steps of securely and stably supporting said frame from said floor at a plurality of spaced points and selectively tilting said frame relative to said points to further control the relative alignment between said length of pipe and said pipeline.

3. The method defined in claim 1 including the further steps of, finally, releasing said length of pipe from said frame and lifting said frame to the surface of said body of water.

4. The method defined in claim 1 including the steps of detecting the relative positions of said length of pipe and said pipeline from a region at atmospheric pressure; and controlling said lateral and axial movements of said pipe from said region.

5. The method defined in claim 1 including the subsequent steps of placing ballast material between said length of pipe and said floor; and thereafter releasing said length of pipe from said frame.

* * * * *